(12) United States Patent
Malloy Desormeaux et al.

(10) Patent No.: US 6,363,224 B1
(45) Date of Patent: Mar. 26, 2002

(54) CAMERA THAT RECORDS PRINT QUANTITY DESIGNATION ON FILM FOR EACH EXPOSURE, AND HAS PRINT QUANTITY TOTALLING

(75) Inventors: Stephen G. Malloy Desormeaux, Rochester; James W. Fulmer, Canandaigua; Robert Hills, Spencerport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/499,812

(22) Filed: Feb. 8, 2000

(51) Int. Cl.[7] ............................................... G03B 17/24
(52) U.S. Cl. ..................... 396/284; 396/287; 396/311
(58) Field of Search .................... 396/299, 297, 396/311, 287, 284, 374, 292; 377/1; 355/112, 40

(56) References Cited

U.S. PATENT DOCUMENTS

| | | | |
|---|---|---|---|
| 4,714,962 A | 12/1987 | Levine | |
| 5,229,810 A | 7/1993 | Cloutier et al. | |
| 5,619,738 A * | 4/1997 | Petruchik et al. | 396/311 |
| 5,710,954 A | 1/1998 | Inoue | |
| 5,778,265 A * | 7/1998 | Seki | 396/311 |
| 5,808,723 A * | 9/1998 | Klees | 355/40 |
| 5,983,035 A | 11/1999 | Funaki | |
| 6,167,204 A * | 12/2000 | Ito | 396/311 |
| 6,198,526 B1 * | 3/2001 | Ohtsuka | 355/40 |
| 6,205,296 B1 * | 3/2001 | Hamada et al. | 396/311 |

FOREIGN PATENT DOCUMENTS

EP    0 011 086 B    1/1983

* cited by examiner

*Primary Examiner*—David M. Gray
(74) *Attorney, Agent, or Firm*—Roger A. Fields

(57) ABSTRACT

A camera for successively capturing images of subjects, has a print quantity selector that can be manually operated to provide various print quantity designations of the number of prints to be made for each one of the captured images. A print reset can be manually operated to change the print quantity designations used for the captured images simultaneously to the same print quantity designation. A print quantity totaller is connected to the print quantity selector and to the print reset for updating a print quantity total which is the sum of the number of prints to be made for the captured images, both when the print quantity selector is used and when the print reset is used.

20 Claims, 7 Drawing Sheets

CAMERA THAT RECORDS PRINT QUANTITY DESIGNATION ON FILM FOR EACH EXPOSURE, AND HAS PRINT QUANTITY TOTALLING

CROSS REFERENCE TO RELATED APPLICATION

Reference is made to commonly assigned copending application Ser. No. 09/494,012, entitled DUAL FILM EXPOSURE, ELECTRONIC EXPOSURE CAMERA WITH ELECTRONIC INFORMATION EDITING AFTER EACH EXPOSURE AND INFORMATION RECORDING ON FILM AFTER COMPLETED EXPOSURE and filed Jan. 28, 2000 in the name of Robert Hills and James W. Fulmer.

FIELD OF THE INVENTION

The invention relates generally to the field of photography, and in particular to image capture cameras in which there is provided a print quantity designation of how many prints are made to be made for each captured image.

BACKGROUND OF THE INVENTION

Cameras for exposing latent images of subjects on successive frames of a filmstrip are known, in which a print quantity selector can be manually operated to provide a print quantity designation of how many prints are to be made for a particular exposed frame, and a magnetic recorder records the print quantity designation on the filmstrip for that exposed frame. These cameras are often referred to as "Advanced Photo System" ("APS") cameras.

THE CROSS-REFERENCED APPLICATION

The cross-referenced application Ser. No. 09/494,012, entitled DUAL FILM EXPOSURE, ELECTRONIC EXPOSURE CAMERA WITH ELECTRONIC INFORMATION EDITING AFTER EACH EXPOSURE AND INFORMATION RECORDING ON FILM AFTER COMPLETED EXPOSURE discloses a dual film image capture, electronic image capture camera that is capable of electronic information editing after each substantially simultaneous film and electronic exposure, and that magnetically records the information adjacent each one of the exposed film frames after completed exposure of the entire film length.

SUMMARY OF THE INVENTION

According to one aspect of the invention, a camera for successively capturing images of subjects, in which respective print quantity designations indicate the number of prints to be made for each one of the captured images, is characterized in that a print quantity totaller calculates a print quantity total which is the sum of the number of prints to be made for every one of the captured images, and updates the print quantity total each time a print quantity designation is used for a particular captured image, whereby a running print total will be maintained.

According to another aspect of the invention, a camera for successively capturing images of subjects, in which a print quantity selector can be manually operated to provide various print quantity designations of how many prints are to be made for each one of the captured images, is characterized in that:

a memory stores the print quantity designations used for the captured images;

a print reset can be manually operated to change the print quantity designations that are stored in the memory simultaneously to the same print quantity designation, whereby one can make the change when the entire quantity of prints to be made for the captured images exceeds a determined maximum print total.

According to another aspect of the invention, a camera for successively capturing images of subjects, in which a print quantity selector can be manually operated to provide various print quantity designations of the number of prints to be made for each one of the captured images, is characterized in that:

a print reset can be manually operated to change the print quantity designations used for the captured images simultaneously to the same print quantity designation; and a print quantity totaller is connected to the print quantity selector and to the print reset for updating a print quantity total which is the sum of the number of prints to be made for the captured images, both when the print quantity selector is used and when the print reset is used.

DETAILED DESCRIPTION OF THE INVENTION

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
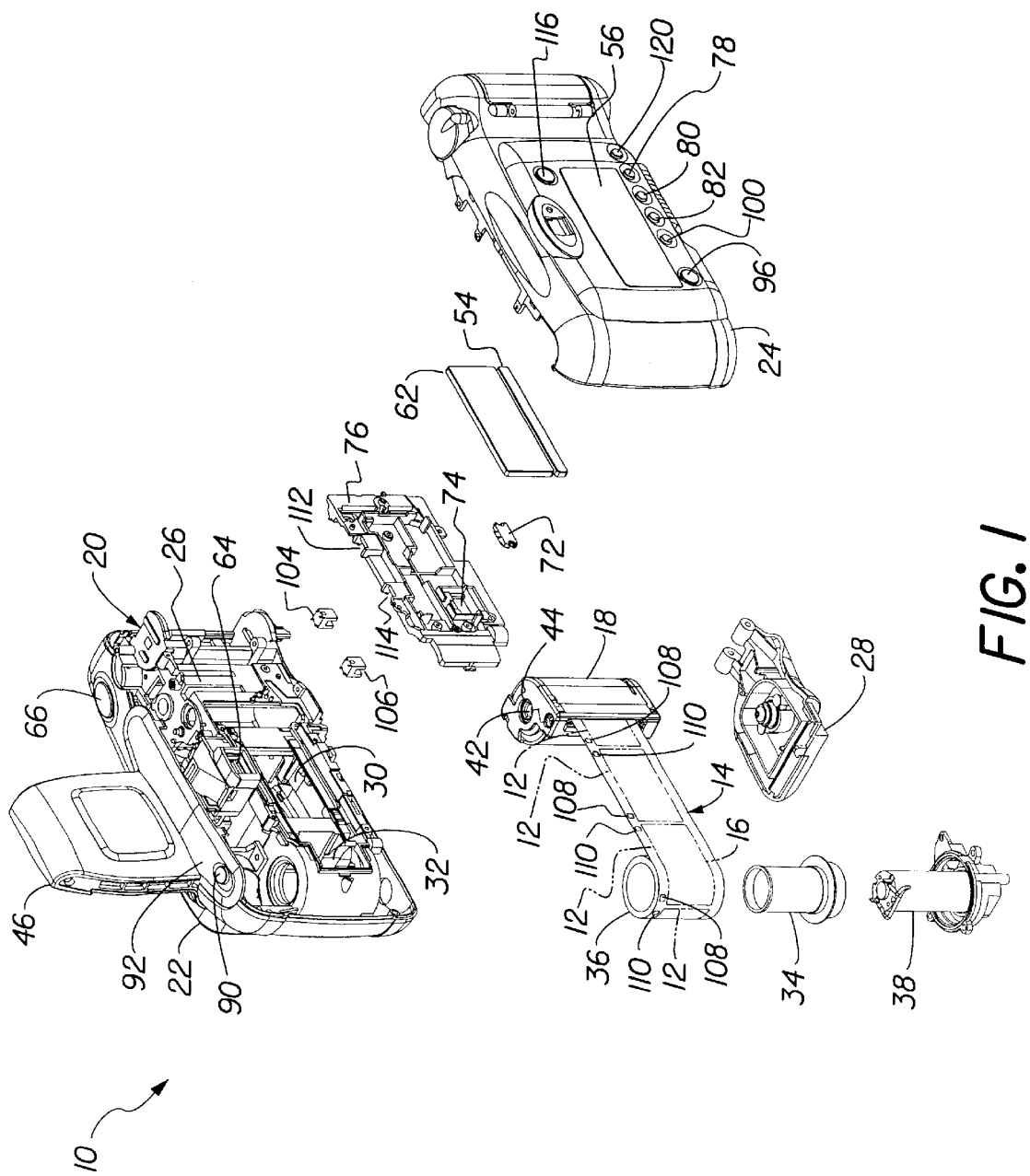
FIG. 1 is a rear exploded perspective view of a dual film exposure, electronic exposure camera consistent with a preferred embodiment of the invention.
Figure 2:
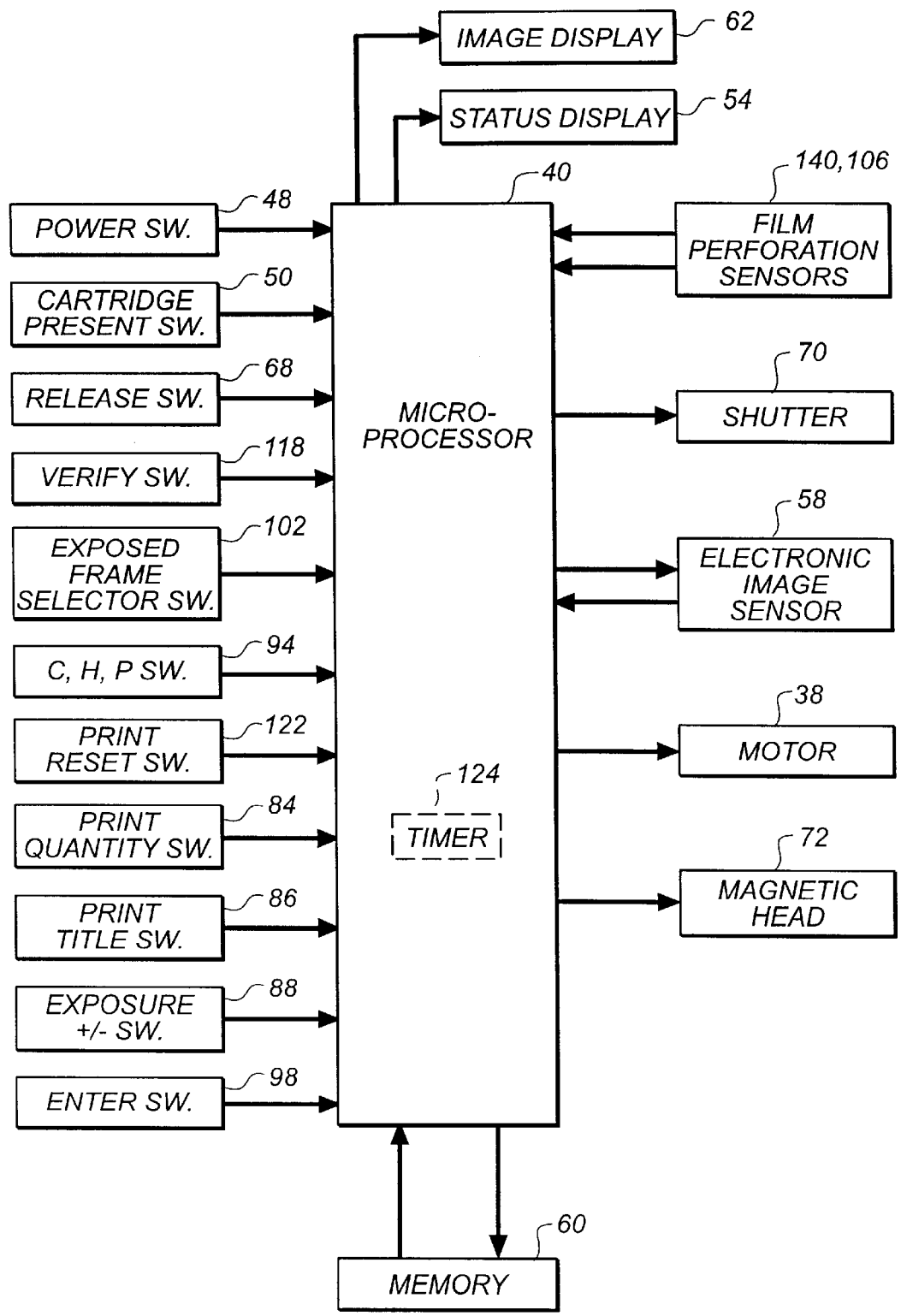
FIG. 2 is a block diagram of various components of the camera.

Referring now to the drawings, FIGS. 1 and 2 show a motorized film advance camera 10 for exposing latent images on successive frames 12 of a known "Advanced Photo System" ("APS") filmstrip 14. The filmstrip 14 has a transparent magnetic overlay which gives it magnetic recording capacity to store various user-selected information along a track 16 adjacent each exposed film frame 12, and it is normally housed in an opaque film cartridge 18. Typically, the filmstrip 14 is available in 15-exposure, 25-exposure, and 40-exposure lengths, and the user-selected information can differ from frame-to-frame.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open back-frame opening 30 at which the respective frames 12 of the filmstrip 14 are temporarily positioned one at a time to be exposed, and an exposed film take-up chamber 32 that contains a film take-up spool 34 which is incrementally rotated following each film exposure to wind the most-recently exposed one of the film frames onto an exposed film roll 36 on the spool (and to position a fresh unexposed film frame at the backframe opening 30). When the film take-up spool 34 is incrementally rotated, the filmstrip 14 is advanced forward one frame increment which is slightly greater than a frame width. A drive motor 38 resides inside the film take-up spool 34 for incrementally rotating the spool to advance the filmstrip 14 forward one frame increment, and its operation is controlled by a known microcomputer 40. When substantially the entire length of the filmstrip 14 is exposed, i.e. the total number of available film frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length rearward into the cartridge.

To magnetically record the user-selected information along the track 16 adjacent each exposed film frame 12, the motor 38 must be actuated after the exposed film length is rewound rearward into the film cartridge 18 to continuously rotate the film take-up spool 34 in order to advance the exposed film length forward. Then, the motor 38 is actuated to continuously rotate the film spool inside the film cartridge 18 in order to rewind the film length with the recorded information rearward into the cartridge, and the door 28 is pivoted open to remove the cartridge from the cartridge receiving chamber 26.

A known electronic flash unit 46 for flash assisted exposures is flipped up from partially covering the front cover part 22 to uncover a taking lens (not shown) preparatory to using the camera 10. See FIG. 1. Flipping up the flash unit 46 closes a normally open power switch 48 connected to the microcomputer 40 to electrically power "on" the camera 10. See FIG. 2.

Figure 3:
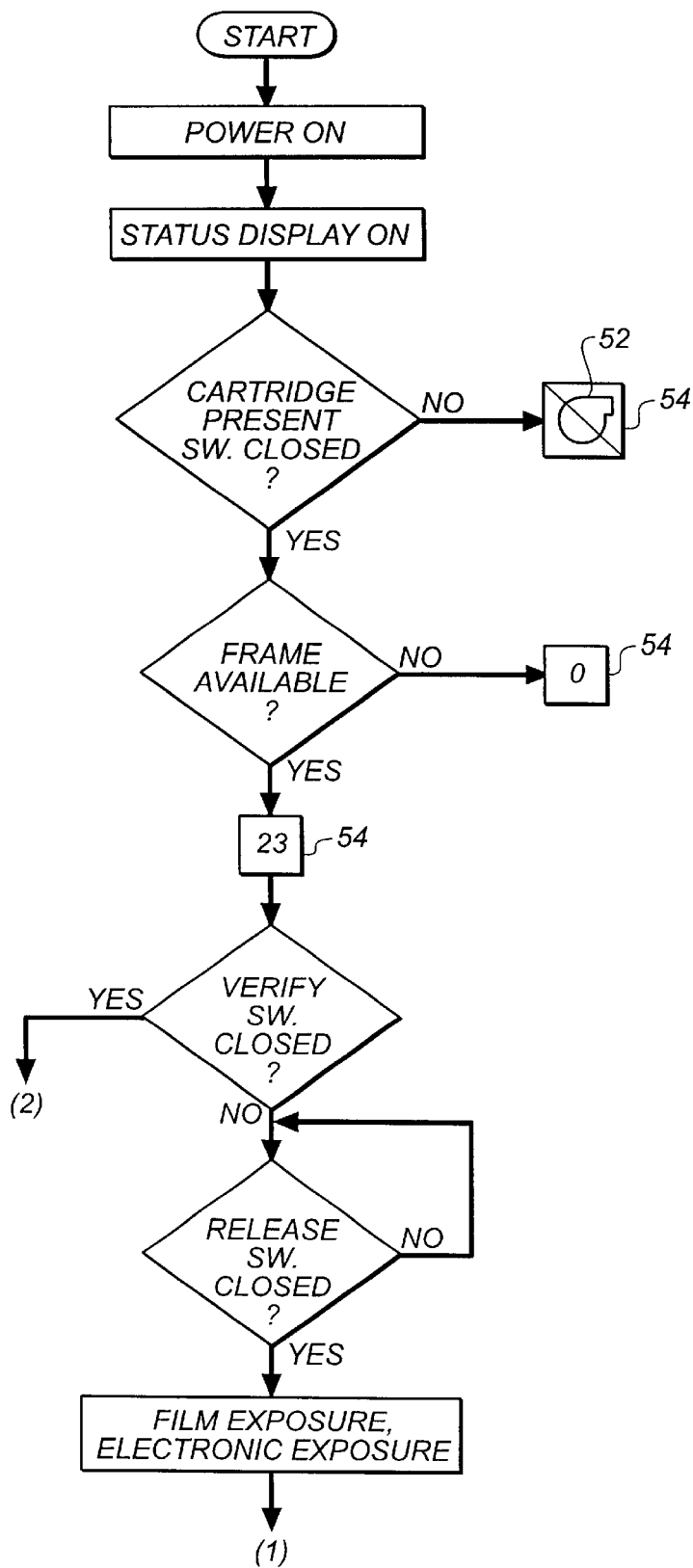
FIGS. 3, 4 and 5 is a flow chart depicting operation of the camera to illustrate the invention.

A normally open cartridge present switch 50 in the cartridge receiving chamber 26 and connected to the microcomputer 40 is closed when the film cartridge 18 is present in the chamber and the door 28 is closed. See FIG. 2. If the camera 10 is powered "on" and the cartridge present switch 50 is open, a visible no-cartridge warning 52 shown in FIG. 3 is shown in a known status display 54 such as a black and white LCD connected to the microcomputer 40. The status display 54 is turned "on" when the power switch 48 is closed, and is located behind a window 56 in the rear cover part 24. See FIG. 1. If the camera 10 is powered "on" and the cartridge present switch 50 is closed, a visible cartridge loaded indication (not shown) is shown in the status display 54

A known electronic image sensor 58, for example a CCD sensor with integrated shuttering capability or a CMOS sensor with integrated shuttering capability, is connected to the microcomputer 40 to form a different electronic image each time one of the unexposed film frames 12 is exposed. The respective electronic images correspond to the latent images on the exposed film frames 12, are each stored in a memory 60 connected to the microcomputer 40, and can be shown one at a time in a known image display 62 such as a color LCD connected to the microcomputer. The image display 62 is located next to the status display 54, behind the window 56 in the rear cover part 24. The memory 60 has storage capacity for storing at least 40 electronic images, since the filmstrip 14 is available in 15-exposure, 25-exposure, and 40-exposure lengths.

A viewfinder 64 for viewing a subject to be photographed is located on the main body part 20. See FIG. 1.

To take a picture, a shutter release button 66 on the front cover part 22 is manually depressed which in turn closes a normally open release switch 68 connected to the microcomputer 40. See FIGS. 1 and 2. The closed switch 68 triggers momentary opening of a known normally closed shutter 70 to expose a latent image on the film frame 12 at the backframe opening 30, and to excite the electronic image sensor 58 to form an electronic image substantially simultaneously with exposure of the latent image. The taking lens (not shown) can be used to focus an image of the subject being photographed, for the electronic image sensor 58 as well as for the filmstrip 14, or a separate lens an be provided for the electronic image sensor. These alternatives are indicated in prior art U.S. Pat. No. 5,710,954 issued Jan. 20, 1998.

A magnetic head 72 is mounted within an opening 74 in a film pressure platen 76 for magnetically recording the user-selected information along the track 16 adjacent each one of the exposed film frames 12. The film pressure platen 76 serves to support each film frame 12 flat for exposure at the backframe opening 30.

The user-selected information, as is known, can be a selected print quantity number preferably ranging from 0–9 prints, a selected (optional) print title in English and other languages, a selected (optional) print exposure correction +/−, and a selected "APS" print format "C" (classic), "H" (HDTV) or "P" (panoramic), for example. A "C" format print is usually 4×6 inches, a wider "H" format print is often 4×7 inches, and a much wider "P" format print is either 4×10 inches or 4×11.5 inches. The selected print quantity number, print title, and print exposure correction, and the selected "APS" print formats "C", "H" or "P", for every one of the exposed film frames 12 are stored in the memory 60. Individual visible indications of the selected print quantity number, print title, and print exposure correction for any one of the exposed film frames 12 can be seen in the status display 54. A visible indication of the selected "APS" print format "C", "H" or "P" for any one of the exposed film frames 12 can be seen in the image display 62 (preferably superimposed on the electronic image shown in the image display). Respective print quantity, title and exposure correction buttons 78, 80 and 82 are provided on the rear cover part 24, and when individually manually depressed one or more times close normally open print quantity, title and exposure correction switches 84, 86 and 88 the same number of times. See FIGS. 1 and 2. The print quantity, title and exposure correction switches 84, 86 and 88 are connected to the microcomputer 40 in order to add new print quantity number, title and exposure correction designations to the memory 60 for a most-recently exposed one of the film frames 12 and to change the print quantity number, title and exposure correction designations stored in the memory 60 for any one of the exposed film frames 12 to new designations for the same exposed film frame. A format selection button 90 is provided on a top plate 92, and when manually depressed one or more times closes a normally open C, H, P switch 94 the same number of times. The C, H, P switch 94 is connected to the microcomputer 40 in order to add a new C, H or P designation to the memory 60 for a most-recently exposed one of the film frames 12 and to change the C, H or P designation stored in the memory 60 for any one of the exposed film frames 12 to a new designation for the same exposed film frame. To enter the newly selected information in the memory 60, an enter button 96 on the rear cover part 24 must be manually depressed which in turn closes a normally open enter switch 98 connected to the microcomputer 40.

If the print quantity switch 84 is not closed one-to-ten times (to designate the print quantity number to be 1, 2, 3, 4, 5, 6, 7, 8, 9, or 0 prints) for a most-recently exposed one of the exposed film frames 12, the default print quantity number for the most-recently exposed frame is "1", or alternatively it can be the same as the last-made print quantity selection. The default print quantity "1" can be stored in the memory 60.

An exposed frame selector button 100 is provided on the rear cover part 24, and when manually depressed one or more times closes a normally open exposed frame selector switch 102 connected to the microcomputer 40 the same number of times, to change the electronic image and the "APS" print format "C", "H" or "P" shown in the image display 62 for any one of the exposed film frames 12, and to change the print quantity number, print title, and print exposure correction shown in the status display 54 for the same exposed film frame, to the electronic image and the user-selected information for another one of the exposed film frames. This is possible because the electronic images that match the exposed film frames, and the user-selected information for the exposed film frames, are stored in the memory 60. Thus, one can effectively scroll through the electronic images and the user-selected information stored in the memory 60 for the exposed film frames 12, and successively see the electronic images and the user-selected information for any one of the exposed film frames in the status and image displays 54 and 62. This is done in preparation for manually depressing the print quantity, title and exposure correction buttons 78, 80 and 82 and the format selection button 90 to change the user-selected information stored in the memory 60 for any one of the exposed film frames 12.

A pair of identical film perforation sensors 104 and 106 for sensing successive pairs of film perforations 108 and 110 in the filmstrip 14 are mounted in respective pockets 112 and 114 in the film pressure platen 76 and are connected to the microcomputer 40. The film perforation sensors 104 and 106, as is known, are used via the microcomputer 40 to decrement a frame count (the number of available film frames 12) stored in the memory 60 by "1", each time the filmstrip 14 is advanced forward a frame increment and the most-recently exposed one of the film frames is wound onto the exposed film roll 36 on the film take-up spool 34. The frame count begins with "15", "25" or "40" depending whether the filmstrip 40 has a 15-exposure, 25-exposure, or 40-exposure length.

A verify (print preview) button 116 is provided on the rear cover part 24, and when manually depressed closes a normally open verify switch 118 connected to the microcomputer 40. See FIGS. 1 and 2. The closed verify switch 118 causes the electronic image and the "APS" print format "C", "H" or "P" stored in the memory 60 for the most-recently exposed one of the film frames 12 to be shown in the image display 62, and it causes the print quantity number, print title, and print exposure correction stored in the memory for the same exposed film frame to be shown in the status display 54. If, however the exposed frame selector switch 102 had been closed to change the electronic image and the "APS" print format "C", "H" or "P" shown in the image display 62 and to change the print quantity number, print title, and print exposure correction shown in the status display 54, from that for the most-recently exposed one of the film frames to that for an earlier exposed one of the film frames, then the closed verify switch 118 causes the electronic image and the user-selected information for the earlier exposed film frame to be shown in the displays.

The microcomputer 40 operates as a print totaller for calculating a print total which is the sum (addition) of the prints to be made for every one of, i.e. all, the exposed film frames 12. The print quantity total existing at any given time is stored in the memory 60, and it is updated via the microcomputer 40 each time a print quantity number is used for a particular one of the exposed film frames 12. The updating is done simply by summing the print quantity number to be used and the existing print quantity total in order to obtain a new print quantity total. If, for example, the existing print quantity total in the memory 60 is "15" for twelve exposed film frames 12 and a print quantity number selected via the print quantity switch 84 for the next exposed film frame is "2", the new print quantity total would be 15 plus 2=17. If, alternatively, the exposed frame selector switch 102 has been closed to change the print quantity number shown in the status display 54, from that for the most-recently exposed one of the film frames to that for an earlier exposed one of the film frames, and the print quantity number for the earlier exposed claim is to be reduced from "2" to "1" via the print quantity switch 84, the new print quantity total would be 15 minus 1=14.

A print reset button 120 is provided on the rear cover part 24, and when manually depressed a single time closes a normally open print reset switch 122 connected to the microcomputer 40 a single time, to change the print quantity numbers stored in the memory 60 for each one of the exposed film frames 12 simultaneously to a single print quantity number preferably "1" for each one of the exposed film frames. Also, the print total for every one of the exposed film frames 12 is updated via the microcomputer 40.

OPERATION

Figure 4:
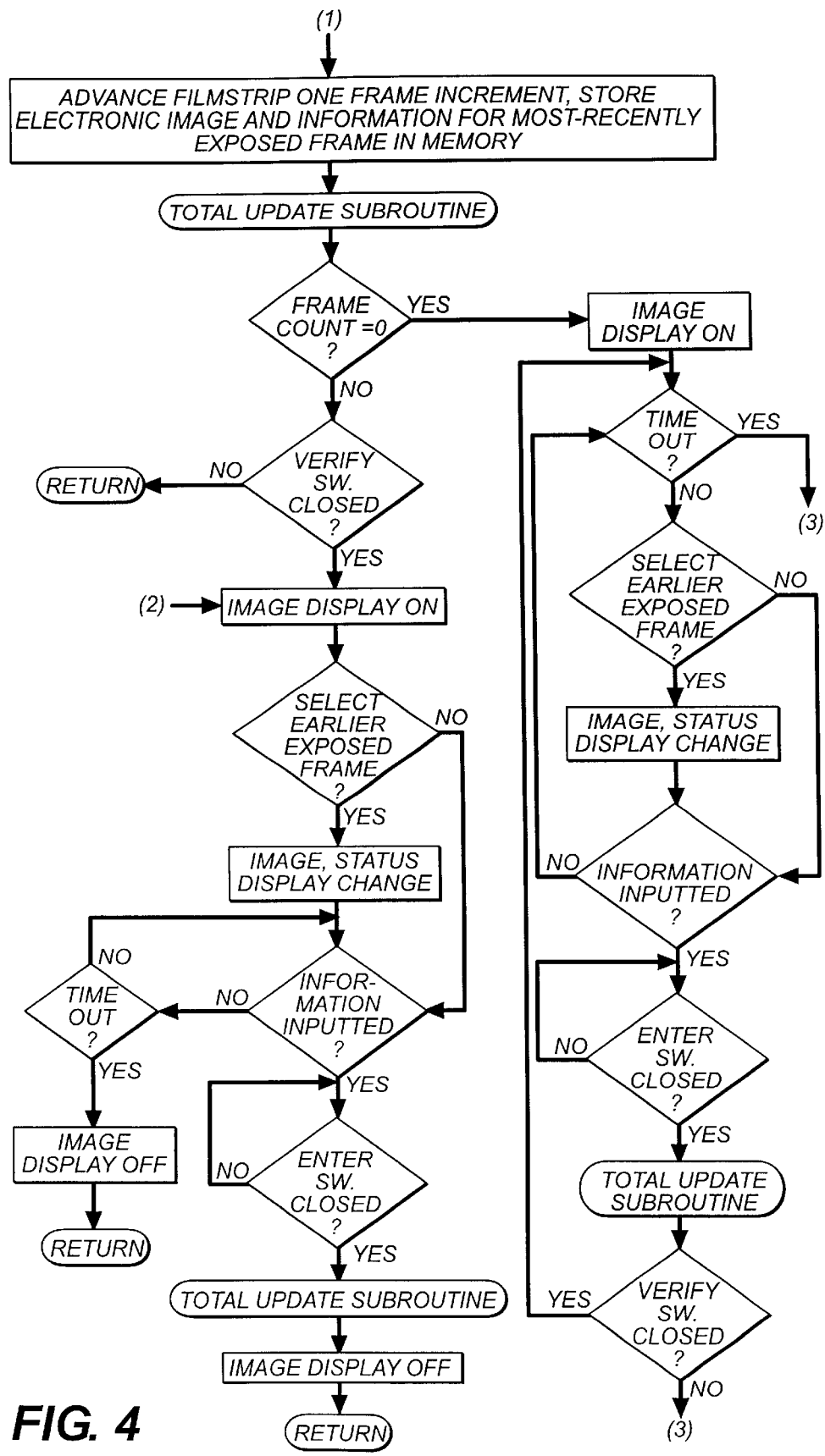
Figure 5:
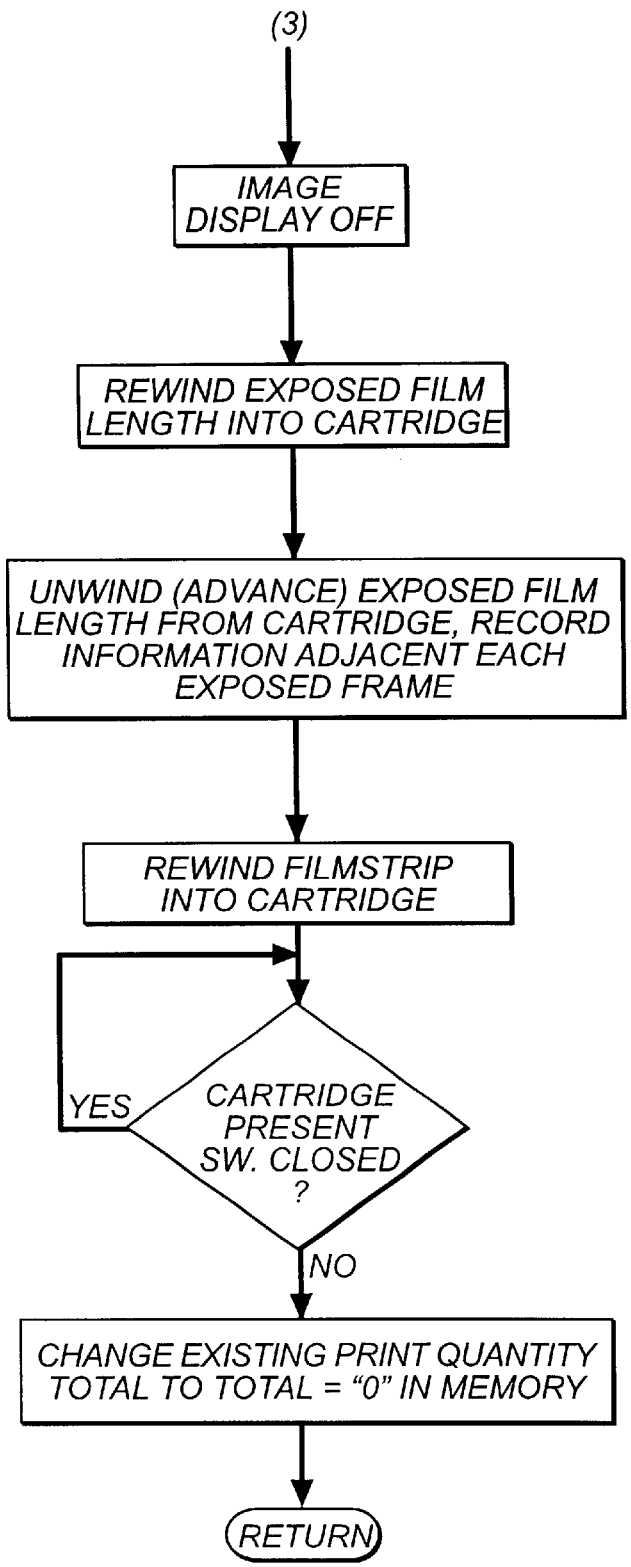

The operation of the camera 10 to illustrate the invention is shown in a flow chart in FIGS. 3–5.

1. Starting at FIG. 3, when the camera 10 is electrically powered "on" by flipping up the electronic flash unit 46, the status display 54 is simultaneously turned "on." The status display 54 shows, among other things, the frame count (the number of available film frames 12)stored in the memory 60, as well as the print total in the memory.

2. If then in FIG. 3 the cartridge present switch 50 remains open because no film cartridge 18 is present in the cartridge receiving chamber 26, the no-cartridge warning 52 is provided in the status display 54.

3. If conversely in FIG. 3 the cartridge present switch 50 is closed because the film cartridge 18 is present in the cartridge receiving chamber 26, the memory 60 is interrogated to determine whether the frame count is greater than "0".

4. If then in FIG. 3 the frame count in the memory 60 is "0", which indicates that the final available one of the film frames 12 has been exposed, i.e. there are no film frames remaining for exposure, the number "0" appears in the status indicator 54.

5. If conversely in FIG. 3 the frame count in the memory 60 is greater than "0", for example "23", which indicates that there are twenty-three film frames 12 available for exposure, the number "23" appears in the status indicator 54.

6. If next in FIG. 3 the verify switch 118 is closed, the image display 62 is turned "on" in FIG. 4 to show the electronic image stored in the memory 60 corresponding to the latent image on the most-recently exposed one (or alternatively an earlier exposed one) of the film frames 12. Also, the status display 54 now shows the user-selected information stored in the memory 60 for the same exposed film frame, except that the visible indication of the selected "APS" print format "C", "H" or "P" is shown in the image display 62 superimposed on the electronic image.

7. If conversely in FIG. 3, the verify switch 118 remains open, and the release switch 68 is not closed within an allotted time, e.g. 150 seconds, determined by a timer 124 in the microcomputer 40, the camera 10 is powered "off" for battery consumption.

8. If conversely in FIG. 3, the verify switch 118 remains open, and the release switch 68 is closed within the allotted time, e.g. 150 seconds, determined by the timer 124 in the microcomputer 40, because a picture is being taken, a latent image is exposed on the film frame 12 at the backframe opening 30 and the electronic image sensor 58 is excited to form an electronic image which matches the latent image on the newly exposed frame.

9. Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. Also, the electronic image and the user-selected information for the most-recently exposed frame 12 are stored in the memory 60, and the frame count stored in the memory is decremented by "1", for example to "22."

10. Then, in FIG. 4 a print total update subroutine, shown in FIG. 6 and separately described later, is performed via the microcomputer 40 to update the existing print total stored in the memory 60 for every one of the film frames 12 then exposed.

11. If next in FIG. 4 the frame count in the memory 60 is greater than "0", the verify switch 114 can be closed.

12. If then in FIG. 4 the verify switch 118 is not closed within the allotted time, e.g. 150 seconds, determined by the timer 124 in the microcomputer 40, or alternatively the release switch 68 is not closed within the same time, the camera 10 is powered "off" for battery consumption.

13. If conversely in FIG. 4 the verify switch 118 is closed within the allotted time (as in FIG. 3), e.g. 150 seconds, determined by the timer 124 in the microcomputer 40, the image display 62 is turned "on" to show the electronic image stored in the memory 60 corresponding to the latent image on the most-recently exposed one (or alternatively an earlier exposed one) of the film frames 12. Also, the status display 54 now shows the user-selected information for the same exposed film frame, except that the visible indication of the selected "APS" print format "C", "H" or "P" is shown in the image display 62 superimposed on the electronic image.

14. If next in FIG. 4 the exposed frame selector switch 102 is not closed within the allotted time, e.g. 150 seconds, determined by a timer 124 in the microcomputer 40, and none of the user-selected information switches 84, 86, 88 and 94 are closed within a brief time, e.g. 10 seconds, determined by the timer, the image display 62 is turned "off". The camera 10 including the status display 54 remains "on."

15. If conversely in FIG. 4 the exposed frame selector switch 102 is not closed within the allotted time, e.g. 150 seconds, determined by the timer 124 in the microcomputer 40, and at least one of the user-selected information switches 84, 86, 88 and 94 is closed within the brief time, e.g. 10 seconds, determined by the timer, then when the enter switch 98 is closed, the electronic image and the new selected information for the most-recently exposed one of the film frames 12 are stored in the memory 60 in place of the previously stored information for the same exposed film frame, the print total update subroutine (shown in FIG. 6 and separately described later) is performed via the microcomputer 40 to update the existing print total stored in the memory 60, and the image display 62 is turned "off".

16. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) are shown in the status and image displays 54 and 62 in place of the previously shown image and information for another one of the exposed film frames. Then, when at least one of the user-selected information switches 84, 86, 88 and 94 is closed within the brief time, e.g. 10 seconds, and the enter switch 98 is closed, the electronic image and the new selected information for the earlier exposed film frame 12 are stored in the memory 60 in place of the previously stored information for the same exposed film frame, the print total update subroutine (shown in FIG. 6 and separately described later) may be performed via the microcomputer 40 to update the existing print total stored in the memory 60, and the image display 62 is turned "off".

17. If in FIG. 4 the frame count in the memory 60 is "0", the image display 62 is turned "on" to show the electronic image stored in the memory 60 corresponding to the latent image on the final exposed one of the film frames 12. Also, the status display 54 now shows the user-selected information for the same exposed film frame, except that the visible indication of the selected "APS" print format "C", "H" or "P" is shown in the image display 62 superimposed on the electronic image. The image display 62 is turned "on" in this instance (as compared with the other instance in FIG. 4 that it is turned "on" ) without having to first close the verify switch 118.

18. If next in FIG. 4 the exposed frame selector switch 102 is not closed within the allotted time, e.g. 150 seconds, and none of the user-selected information switches 84, 86, 88 and 94 are closed within a brief time, e.g. 10 seconds, the image display is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Then, the door 28 is pivoted open to remove the film cartridge 18 from the cartridge receiving chamber 26. When the film cartridge 18 is removed, the cartridge present switch 50 opens and the microcomputer 40 changes the existing print quantity total stored in the memory 60 to "0".

19. If conversely in FIG. 4 the exposed frame selector switch 102 is not closed within the allotted time, e.g.

150 seconds, and at least one of the user-selected information switches 84, 86, 88 and 94 is closed within the brief time, e.g. 10 seconds, the image display 62 remains "on." Then when the enter switch 98 is closed, the print total update subroutine (shown in FIG. 6 and separately described later) may be performed via the microcomputer 40 to update the existing print total stored in the memory 60. If the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Then, the door 28 is pivoted open to remove the film cartridge 18. When the film cartridge 18 is removed, the cartridge present switch 50 opens and the microcomputer 40 changes the print quantity total stored in the memory to "0".

20. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) is shown in the status and image displays 54 and 62. Then, when at least one of the user-selected information switches 84, 86, 88 and 94 is closed within the brief time, e.g. 10 seconds, and the enter switch 98 is closed, the print total update subroutine (shown in FIG. 6 and separately described later) may be performed via the microcomputer 40 to update the existing print total stored in the memory 60. If the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Then, the door 28 is pivoted open to remove the film cartridge 18. When the film cartridge 18 is removed, the cartridge present switch 50 opens and the microcomputer 40 changes the print quantity total stored in the memory to "0".

21. If conversely in FIG. 4 the verify switch 118 is closed within the allotted time, e.g. 150 seconds, go back to step 18 above.

Total Update Subroutine

Figure 6:
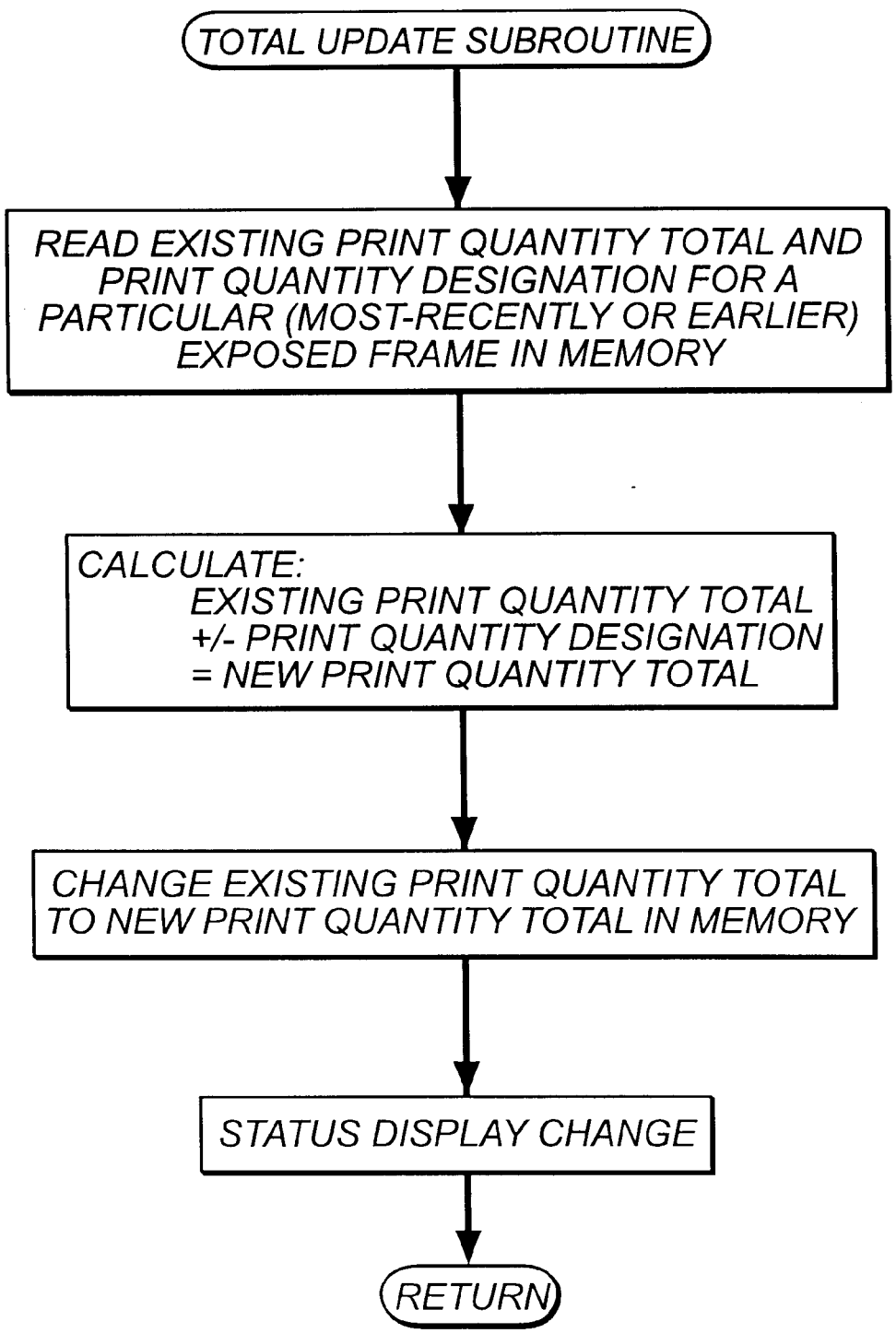
FIG. 6 is a flow chart of a subroutine for updating a print total.

The print total update subroutine shown in FIG. 6 is performed via the microcomputer 40 to update the existing print total stored in the memory 60 for every one of the film frames 12 then exposed (including the most-recently exposed film frame and the earlier exposed film frames).

1. First in FIG. 6 the microcomputer 40 reads the print quantity number 0–9 stored in the memory 60 for a particular exposed film frame (either a most-recently exposed film frame 12 or an earlier exposed film frame), and it reads the existing print quantity total stored in the memory for every one of the film frames then exposed.

2. Next in FIG. 6 the microcomputer 40 performs its calculation to update the existing print quantity total to a new print quantity total. The updating is done simply by summing the print quantity number that has been read and the existing print quantity total that has been read in order to obtain the new print quantity total. If, for example, the existing print quantity total that has been read is "15" for twelve exposed film frames 12 and the print quantity number that has been read for a most-recently exposed film frame is "2", the new print quantity total would be "15" plus 2=17. If, alternatively, the existing print quantity total that has been read is "15" for twelve exposed frames and the print quantity number that has been read for an earlier exposed film frame has been reduced from "2" to "1" via the print quantity switch 84, the new print quantity total would be 15 minus 1=14.

3. Then in FIG. 6 the existing print quantity total is changed to the new print quantity total in the memory 60 and the status display 54 is changed to reflect this update.

Print Reset Subroutine

Figure 7:
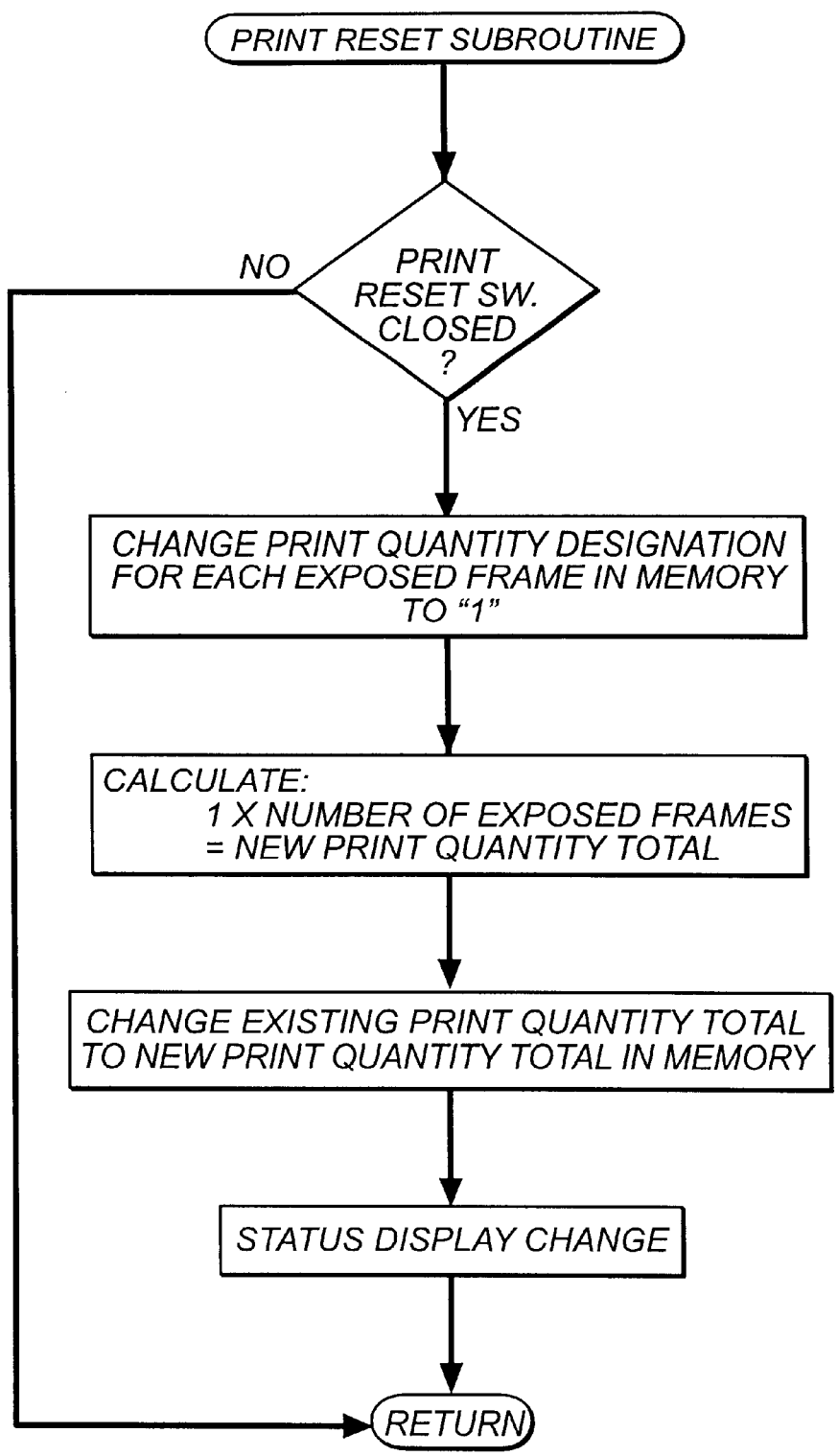
FIG. 7 is a flow chart of a subroutine for resetting the print total.

The print reset subroutine shown in FIG. 7 is performed via the microcomputer 40 to change the print quantity numbers stored in the memory 60 for each one of the exposed film frames 12 simultaneously to a single print quantity number preferably "1" for each one of the exposed film frames. Also, the print total for every one of the exposed film frames 12 is updated via the microcomputer 40 to reflect this change.

The print reset subroutine can be used any time the print total exceeds a desired maximum print total.

1. If first in FIG. 7 the print reset switch 122 is closed, the microcomputer 40 changes the print quantity numbers 0–9 stored in the memory 60 for each one of the exposed film frames 12 simultaneously to the same print quantity number preferably "1".

2. Next in FIG. 7 the existing print quantity total stored in the memory 40 is updated by multiplying "1"×the number of exposed film frames to obtain the new print quantity total.

3. Then in FIG. 7 the existing print quantity total is changed to the new print quantity total in the memory 60 and the status display 54 is changed to reflect this update.

The invention has been described with reference to a preferred embodiment. However, it will be appreciated that variations and modifications can be effected by a person of ordinary skill in the art without departing from the scope of the invention. For example, when in FIG. 4 the enter switch 98 is not closed within an allotted time, e.g. 150 seconds, determined by the timer 124 in the microcomputer 40, and alternatively the release switch 68 is not closed within the same time, the camera 10 could be powered "off" for battery consumption.

PARTS LIST 10. camera
12. film frames
14. filmstrip
16. track
18. film cartridge
20. main body part
22. front over part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spool end
46. electronic flash unit
48. power switch
50. cartridge present switch
52. no-cartridge warning
54. status display
56. window
58. electronic image sensor
60. memory
62. image display
64. viewfinder
66. shutter release button
68. release switch
70. shutter
72. magnetic head
74. opening
76. film pressure platen
78. print quantity button
80. print title button
82. exposure correction button
84. print quantity switch
86. print title switch
88. exposure correction switch
90. format selection button
92. top plate
94. C,H,P switch
96. enter button
98. enter switch
100. exposed frame selector button
102. exposed frame selector switch
104. film perforation sensor
106. film perforation sensor
108. film perforation
110. film perforation
112. pocket
114. pocket
116. verify button
118. verify switch
120. print reset button
122. print reset switch
124. timer

What is claimed is:

1. A camera for successively capturing images of subjects, in which respective print quantity designations indicate the number of prints to be made for each one of the captured images, is characterized in that
a print quantity totaller calculates a print quantity total which is the sum of the number of prints to be made for all the captured images, and updates the print quantity total each time a print quantity designation is used for a particular captured image, whereby a running print total will be maintained with each update.

2. A camera as recited in claim 1, wherein a memory connected to said print quantity totaller stores the print quantity total, and said print quantity totaller reads the print quantity total stored in said memory and the print quantity designation used for a particular captured image to update the print quantity total.

3. A camera as recited in claim 1, wherein a display connected to said print quantity totaller displays the print quantity total each time the print quantity total is updated.

4. A camera for successively capturing images of subjects is characterized in that:
a print quantity selector provides respective print quantity designations of the number of prints to be made for a most-recent captured image and for any one of earlier captured images; and
a print quantity totaller calculates a print quantity total which is the sum of the number of prints to be made for all the captured images, and is connected to said print quantity selector to update the print quantity total each time a print quantity designation is used for the most-recent captured image or for an earlier captured image, whereby a running print total will be maintained with each update.

5. A camera for successively capturing images of subjects, in which a print quantity selector can be manually operated to provide various print quantity designations of how many prints are to be made for each one of the captured images, is characterized in that:
a memory stores the print quantity designations used for the captured images;
a print reset can be manually operated to simultaneously change the print quantity designations that are stored in said memory to the same print quantity designation, whereby one can make the change when the entire quantity of prints to be made for the captured images exceeds a determined maximum print total.

6. A camera for successively capturing images of subjects, in which a print quantity selector can be manually operated to provide various print quantity designations of the number of prints to be made for each one of the captured images, is characterized in that:
a print reset can be manually operated to simultaneously change the print quantity designations used for the captured images to the same print quantity designation; and
a print quantity totaller is connected to said print quantity selector and to said print reset for updating a print quantity total which is the sum of the number of prints to be made for all the captured images, both when said print quantity selector is used and when said print reset is used.

7. A camera for exposing latent images of subjects on successive frames of a filmstrip, in which a print quantity selector provides respective print quantity designations of the number of prints to be made for each one of the exposed frames, and a recorder records the print quantity designations on the filmstrip for every one of the exposed frames, is characterized in that:
a print quantity totaller calculates a print quantity total which is the sum of the number of prints to be made for all the exposed frames, and is connected to said print quantity selector for updating the print quantity total to make it current each time a print quantity designation is used for a particular exposed frame, in order to provide a running print total with each update; and a display is connected to said print quantity totaller for displaying the print quantity designation used for a particular exposed frame and for displaying the print quantity total.

8. A camera as recited in claim 7, wherein said display displays the print quantity total each time said print quantity totaller updates the print quantity total.

9. A camera for exposing latent images of subjects on successive frames of a filmstrip, in which a print quantity selector provides respective print quantity designations of the number of prints to be made for each one of the exposed frames, and a recorder records the print quantity designations on the filmstrip for every one of the exposed frames, is characterized in that:

a print quantity totaller calculates a print quantity total which is the sum of the number of prints to be made for all the exposed frames, and is connected to said print quantity selector for updating the print quantity total to make it current each time a print quantity designation is used for a particular exposed frame;

a display is connected to said print quantity totaller for displaying the print quantity designation used for a particular exposed frame and for displaying the print quantity total;

a print reset can be manually operated to change the print quantity designations used for the exposed frames simultaneously to the same print quantity designation; and said print quantity totaller is connected to said print reset to update the print quantity total when the print quantity designations used for the exposed frames are changed to the same print quantity designation.

10. A camera as recited in claim 9, wherein said print reset changes the print quantity designations used for the exposed frames to a print quantity designation that indicates only a single print is to be made for each one of the exposed frames.

11. A camera as recited in claim 7, wherein an exposed frame selector can be manually operated to select any one of the exposed frames, said print quantity selector is connected to said exposed frame selector to change the print quantity designation for any one of the exposed frames that is selected with said exposed frame selector, and said print quantity totaller updates the print quantity total when said print quantity selector changes the print quantity designation for any one of the exposed frames that is selected with said exposed frame selector.

12. A camera for exposing latent images of subjects on successive frames of a filmstrip, in which a print quantity selector provides respective print quantity designations of the number of prints to be made for each one of the exposed frames, and a recorder records the print quantity designations on the filmstrip for every one of the exposed frames, is characterized in that:

a print quantity totaller calculates a print quantity total which is the sum of the number of prints to be made for all the exposed frames, and is connected to said print quantity selector for updating the print quantity total to make it current each time a print quantity designation is used for a particular exposed frame;

a display is connected to said print quantity totaller for displaying the print quantity designation used for a particular exposed frame and for displaying the print quantity total;

a motor is actuated to incrementally advance the filmstrip forward to permit each unexposed one of the film frames to be exposed, is actuated after the final available one of the film frames is exposed to rewind the exposed film length rearward, and then is actuated first to continuously advance the exposed film length forward and finally to rewind the exposed film length rearward; and said recorder is a magnetic head that magnetically records the print quantity designations on the exposed film length when the exposed film length is continuously advanced forward.

13. A camera for exposing latent images of subjects on successive frames of a filmstrip, in which a print quantity selector provides respective print quantity designations of the number of prints to be made for each one of the exposed frames, and a recorder records the print quantity designations on the filmstrip for every one of the exposed frames, is characterized in that:

a print quantity totaller calculates a print quantity total which is the sum of the number of prints to be made for all the exposed frames, and is connected to said print quantity selector for updating the print quantity total to make it current each time a print quantity designation is used for a particular exposed frame;

a display is connected to said print quantity totaller for displaying the print quantity designation used for a particular exposed frame and for displaying the print quantity total;

a cartridge receiving chamber is adapted to receive a film cartridge for the filmstrip; and a cartridge present sensor for determining whether the film cartridge is present in or removed from said cartridge receiving chamber is connected to said print totaller to change the print quantity total to "0" when the film cartridge is removed from said cartridge receiving chamber.

14. A camera for exposing latent images of subjects on successive frames of a filmstrip having magnetic recording capacity, in which an electronic image sensor forms successive electronic images corresponding to the latent images on every one of the exposed frames, a print quantity selector can be manually operated to provide respective print quantity designations of the number of prints to be made for each one of the exposed frames, and a magnetic head magnetically records one of the print quantity designations on the filmstrip for every one of the exposed frames, is characterized in that:

a print quantity totaller calculates a print quantity total which is the sum of the number of prints to be made for all the exposed frames, and is connected to said print quantity selector for updating the print quantity total to make it current when a print quantity designation is provided for a particular exposed frame;

a memory stores the electronic images, the print quantity designations, and the print quantity total, for all the exposed frames; and a display displays the electronic image and the print quantity designation stored in said memory for a particular exposed frame, and displays the print quantity total, each time the print quantity total is updated.

15. A camera as recited in claim 14, wherein an exposed frame selector can be manually operated to change the electronic image and the print quantity designation shown in said display for any one of the exposed frames to the electronic image and the print quantity designation stored in said memory for another one of the exposed frames, said print quantity selector can be manually operated to change the print quantity designation stored in said memory for the particular exposed frame that corresponds to the electronic image shown in said display, and said print quantity totaller can add to and subtract from the print quantity total to update the print quantity total.

16. A method of cumulating a print quantity total in an image capture camera comprises the steps of:

successively capturing images of subjects;

storing respective print quantity designations of the number of prints to be made for each one of the captured images; and updating a print quantity total which is the sum of the number of prints to be made for all the captured images each time a print quantity designation is used for a particular captured image, whereby a running print total will be maintained.

17. A method as recited in claim 16, further having the step of displaying the print quantity total each time it is update.

18. A method of changing print quantity selections made in an image capture camera comprises the steps of:

successively capturing images of subjects;

storing respective print quantity designations of the number of prints to be made for each one of the captured images; and simultaneously changing the print quantity designations that are stored to the same print quantity designation when the entire quantity of prints to be made for the captured images exceeds a determined maximum print total.

19. A method of cumulating a print quantity total in an image capture camera comprises the steps of:

successively capturing images of subjects;

storing respective print quantity designations of the number of prints to be made for each one of the captured images;

simultaneously changing the print quantity designations that are stored to the same print quantity designation when a print quantity total which is the sum of the number of prints to be made for all the captured images exceeds a determined maximum print total; and updating the print quantity total both each time one of the print quantity designations is stored and when the print quantity designations that are stored are changed simultaneously to the same print quantity designation.

20. A method as recited in claim 19, wherein the print quantity total is updated by multiplying "1" times the number of captured images to obtain the new print quantity total when the print quantity designations that are stored are changed simultaneously to the same print quantity designation.

* * * * *